(12) United States Patent
Choi et al.

(10) Patent No.: US 10,030,803 B2
(45) Date of Patent: Jul. 24, 2018

(54) ROBOT FOR INSPECTION OF PIPELINE USING MULTI-OUTPUT DIFFERENTIAL MODULE

(71) Applicant: Research & Business Foundation SUNGKYUNKWAN UNIVERSITY, Suwon-si (KR)

(72) Inventors: Hyouk Ryeol Choi, Gunpo-si (KR); Homoon Kim, Bucheon-si (KR); Hyeong Min Moon, Suwon-si (KR); Chanmin Park, Busan (KR); Seung Ung Yang, Cheongjusi (KR); Yun Seok Choi, Seoul (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 254 days.

(21) Appl. No.: 15/012,071

(22) Filed: Feb. 1, 2016

(65) Prior Publication Data
US 2016/0223123 A1 Aug. 4, 2016

(30) Foreign Application Priority Data
Feb. 2, 2015 (KR) .................. 10-2015-0016161

(51) Int. Cl.
*F16H 37/08* (2006.01)
*F16L 55/32* (2006.01)
*F16L 101/30* (2006.01)

(52) U.S. Cl.
CPC ........... *F16L 55/32* (2013.01); *F16L 2101/30* (2013.01)

(58) Field of Classification Search
CPC ...................................................... F16H 37/08
See application file for complete search history.

(56) References Cited

U.S. PATENT DOCUMENTS

2002/0190682 A1* 12/2002 Schempf ............... G01M 3/005
318/568.11

FOREIGN PATENT DOCUMENTS

| CN | 103386407 A | * 11/2013 |
| KR | 10-1407648 B1 | 6/2014 |
| KR | 10-1475022 B1 | 12/2014 |

* cited by examiner

Primary Examiner — Tisha D Lewis
(74) Attorney, Agent, or Firm — NSIP Law

(57) ABSTRACT

Provided herein is a robot for inspection of a pipeline using a multi-output differential module, the robot including a robot body configured to move along an inside of the pipeline, and having a driving power supply unit; a proceeding unit rotatably-connected to the robot body, and provided with a plurality of active proceeding units having proceeding wheels that proceed along an inner wall of the pipeline; and a power transmission unit supported against the robot body, connected to the driving power supply unit to transmit driving power to the active proceeding unit, and having the multi-output differential module that distributes the transmitted driving power to the active proceeding unit.

15 Claims, 12 Drawing Sheets

ROBOT FOR INSPECTION OF PIPELINE USING MULTI-OUTPUT DIFFERENTIAL MODULE

CROSS REFERENCE TO RELATED APPLICATION(S)

This application claims the benefit under 35 USC 119 (a) of Korean Patent Application No. 10-2015-0016161 filed on Feb. 2, 2015 in the Korean Intellectual Property Office, the entire disclosure of which is incorporated herein by reference for all purposes.

BACKGROUND

1. Field

The following description relates to a robot for inspection of pipeline using a multi-output differential module, and more particularly, to a robot for inspection of a pipeline using a multi-output differential module provided in the robot to distribute a driving power transmitted to a plurality of proceeding units.

2. Description of Related Art

Generally, a pipeline that is one of the structures of an industrial infrastructure facility is a representative facility for transferring various energy resources such as gas/petroleum and the like and for evenly distributing the energy resources in right places.

These various kinds of pipelines are distributed here and there nationwide just like blood vessels in a human body, and are being settled as core infrastructure facilities that supply relentless amount of energy resources such as gas/petroleum and the like to various urban infrastructure facilities and plant facilities. Furthermore, pipelines in large-scale plants such as petrochemical plants are being used as main facilities for transferring various chemical materials to be refined and processed.

However, after a certain period of time passes since installing a facility, pipelines may be damaged due to corrosion caused by moisture and various chemical materials, and effects from external environments, and damaged pipelines may cause leakage of internal materials to outside, which is a problem.

Leakage of petroleum and chemical materials may cause serious environmental pollution, and leakage of gas may cause massive gas explosion accidents and the like. Therefore, pipelines need to be inspected and replaced on a regular basis when a certain period of time has passed.

Pipelines may be classified into two types depending on the shape of installation: broad type pipelines and dense type pipelines. The broad type pipelines are mainly used for water supply/sewerage pipelines, gas supply pipelines, petroleum supply pipelines, and the like mostly in urban and national infrastructure facilities. These types of pipelines are usually laid underground for damage protection from outside, urban landscape maintenance, and anti-corrosion and the like, but a disadvantage of these types of pipelines is that the pipelines must be taken out every time it needs to be repaired or inspected.

The dense type pipelines are mainly used for plants such as petrochemical factories, and various types of pipelines are usually tangled to one another due to complicated transfer systems, and in many cases, there are path divergent areas (for example, divergent ducts). However, a disadvantage of this type of pipelines is that in the case where a dense type pipeline positioned in an interior area needs to be inspected, the pipelines in exterior areas of that pipeline all need to be removed. Likewise, pipelines installed in high places are not easily approachable either.

Due to these reasons, there has been a need to develop an inspection equipment that could approach inside a pipeline more easily at a lower cost, and that could inspect the inside of the pipeline while moving in a manner that is suitable to the 3-dimensional shapes of the pipeline elements.

As a result, mobile robots have been developed that could thoroughly inspect inside a pipeline while driving inside the very peculiar and limited 3-dimensional space called pipeline, and much research is ongoing these days.

However, the problem with conventional pipeline inspection robots is that they have multiple proceeding wheels for turning directions according to different shapes of the pipeline, and driving units for each of the proceeding wheels so as to control the state of motion of each proceeding wheel individually, which increases the size of the robot.

PRIOR ART DOCUMENTS

Patents

Korean Patent Publication no. 10-2009-0010697 (Sung Kyun Kwan University, Academic-Industrial Cooperation Group), Jan. 30, 2009

SUMMARY

Therefore, a purpose of the present disclosure is to resolve the problems of prior art, that is to provide a robot for inspection of pipeline using a multi-output differential module capable of distributing driving power to a plurality of proceeding units with only one driving unit without installing a driving unit for each of the plurality of proceeding units.

According to an aspect of the present disclosure, there is provided a robot for inspection of pipeline using a multi-output differential module, the robot including a robot body configured to move along an inside of the pipeline, and having a driving power supply unit; a proceeding unit rotatably-connected to the robot body, and provided with a plurality of active proceeding units having proceeding wheels that proceed along an inner wall of the pipeline; and a power transmission unit supported against the robot body, connected to the driving power supply unit to transmit driving power to the active proceeding unit, and having the multi-output differential module that distributes the transmitted driving power to the active proceeding unit.

Herein, the multi-output differential module may include a differential gear unit rotatably-connected to the robot body, and configured to transmit the power to each active proceeding unit; and a differential gear rotating unit connected to the driving power supply unit, and configured to receive the driving power from the driving power supply unit to rotate the differential gear unit.

The differential gear unit may include a differential gear frame unit that is connected to the differential gear rotating unit; a first output gear and second output gear that are connected such that they are relatively rotatable against the differential gear frame unit and between each other; a third output gear and fourth output gear that are connected such that they are relatively rotatable against the differential gear frame unit and between each other; a first planetary gear that is rotatably-connected to a first rotation axis provided in the differential gear frame unit and that is geared to an inner gear teeth formed in an inner wall of the first output gear; a second planetary gear that is rotatably-connected to a second rotation axis provided in the differential gear frame unit and that is geared to an inner gear teeth geared to the first planetary gear and formed in an inner wall of the second output gear; a third planetary gear that is rotatably-connected to the first rotation axis and that is geared to the inner gear teeth formed in an inner wall of the third output gear; and a fourth planetary gear that is rotatably-connected to the second rotation axis and that is geared to an inner gear teeth geared to the third planetary gear and formed in an inner wall of the fourth output gear.

The differential gear rotating unit may include a main driving gear connected to the driving power supply unit; a first subsidiary driving gear geared to the main driving gear; a rotation axis for subsidiary driving gear connected to the first subsidiary driving gear; a second subsidiary driving gear connected to the rotation axis for subsidiary driving gear; and a ring gear for differential gear unit connected to the differential gear unit, and geared to the second subsidiary driving gear.

The power transmission unit may include a driving power transmission gear module connected to the multi-output differential module and to the active proceeding unit, and configured to transmit the driving power to the active proceeding unit.

The active proceeding unit may include a first active proceeding unit and second active proceeding unit arranged on a front area of the robot body; and a third active proceeding unit and fourth active proceeding unit arranged on a rear area of the robot body.

The first active proceeding unit and second active proceeding unit may be arranged symmetrically to each other based on a central area of the robot body, and the third active proceeding unit and fourth active proceeding unit may be arranged symmetrically to each other based on a central area of the robot body.

The proceeding unit may further include a passive proceeding unit that is rotatably-connected to the robot body, and that has a proceeding wheel supported against the inner wall of the pipeline.

The passive proceeding unit may include a first passive proceeding unit and second passive proceeding unit that are positioned in a front area of the robot body and are arranged symmetrically to each other based on a central area of the robot body, and a third passive proceeding unit and fourth passive proceeding unit that are positioned in a rear area of the robot body and are arranged symmetrically to each other based on a central area of the robot body.

The robot may further include a proceeding unit distance adjusting unit that is supported against the robot body, connected to a proceeding unit distance adjusting power supply unit, and connected to the active proceeding unit and passive proceeding unit to move the active proceeding unit and passive proceeding unit towards or away from the robot body.

The proceeding unit distance adjusting unit may include an arm module connected to each of the active proceeding unit and passive proceeding unit; and an arm module rotating unit connected to the arm module and configured to rotate the arm module.

The arm module may include a first arm body that is rotatably-connected to each of the active proceeding unit and passive proceeding unit; a second arm body that is rotatably-connected to the arm module rotating unit and to which the first arm body is connected in a slidable manner; and an arm module elasticity body that is connected to the first arm body and second arm body and that elastically supports the first arm body.

The arm module rotating unit may include a first manipulating gear to which the arm module is rotatably-connected; a second manipulating gear geared to the first manipulating gear; and a proceeding unit distance adjusting power transmission unit connected to the second manipulating gear and to the proceeding unit distance adjusting power supply unit to transmit the power of the proceeding unit distance adjusting power supply unit to the second manipulating gear.

The proceeding unit distance adjusting power transmission unit may include a power control unit for selectively transmitting or stop transmitting the power supplied from the proceeding unit distance adjusting power supply unit to the second manipulating gear.

The power control unit may include a rotation axis for power transmission that receives the power of the proceeding unit distance adjusting power supply unit and rotates; an idle gear that is connected to the rotation axis for power transmission in a relatively rotatable manner; a sliding gear that rotates together with the rotation axis for power transmission but connected to the rotation axis for power transmission in such a manner that it is slidable towards and away from the idle gear; and a side gear arranged between the sliding gear and idle gear, geared to the sliding gear and connected to the second manipulating gear; and a sliding gear support unit that is connected to the robot body such that it is relatively movable against the robot body and that supports the sliding gear in a direction towards and away from the idle gear; an elasticity body for power control unit that is supported against the idle gear, and that elastically-biases the sliding gear away from the idle gear; and a stopper provided in the robot body, and is selectively connected to or disconnected from the sliding gear support unit to selectively restrict the movement of the sliding gear support unit.

According to the present disclosure, it is possible to provide a robot for inspection of pipeline including a plurality of active proceeding units provided with proceeding wheels configured to proceed along an inner wall of the pipeline, wherein a multi-output differential module distributes a driving power being supplied from a single driving power supply unit to the active proceeding units, and therefore there is no need to install additional driving power supply units for each of the active proceeding units, thereby reducing the size of the robot and maximizing space utility.

DETAILED DESCRIPTION

Figure 1:
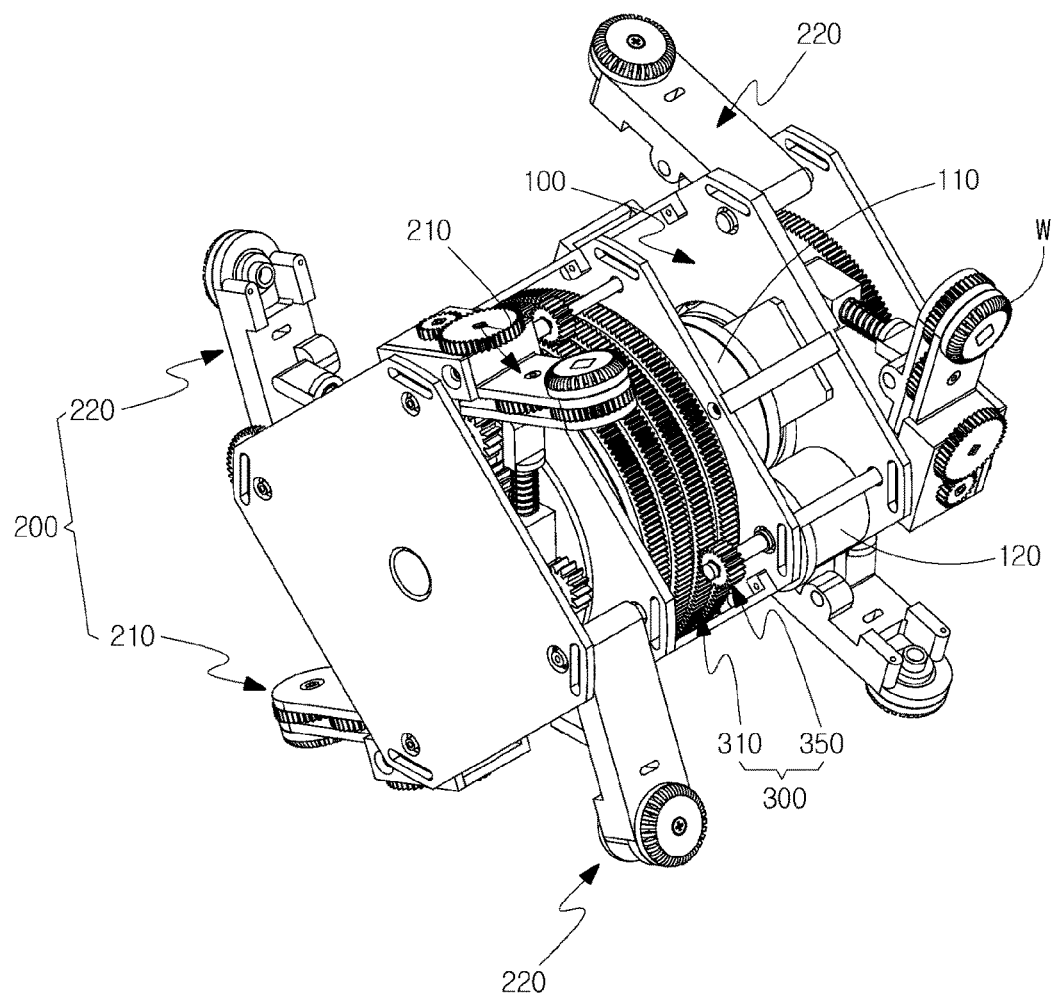
FIG. 1 is a view illustrating a robot for inspection of a pipeline using a multi-output differential module according to an embodiment of the present disclosure.

In explaining various embodiments of the present disclosure, a representative embodiment will be explained using like reference numerals to indicate the like components, and in explaining other embodiments, components that are different from the first embodiment will be explained.

Hereinafter, explanation will be made in detail on an active joint module according to an embodiment of the present disclosure and a robot for inspection of pipeline using a multi-output differential module having the active joint module with reference to the drawings attached.

Figure 2:
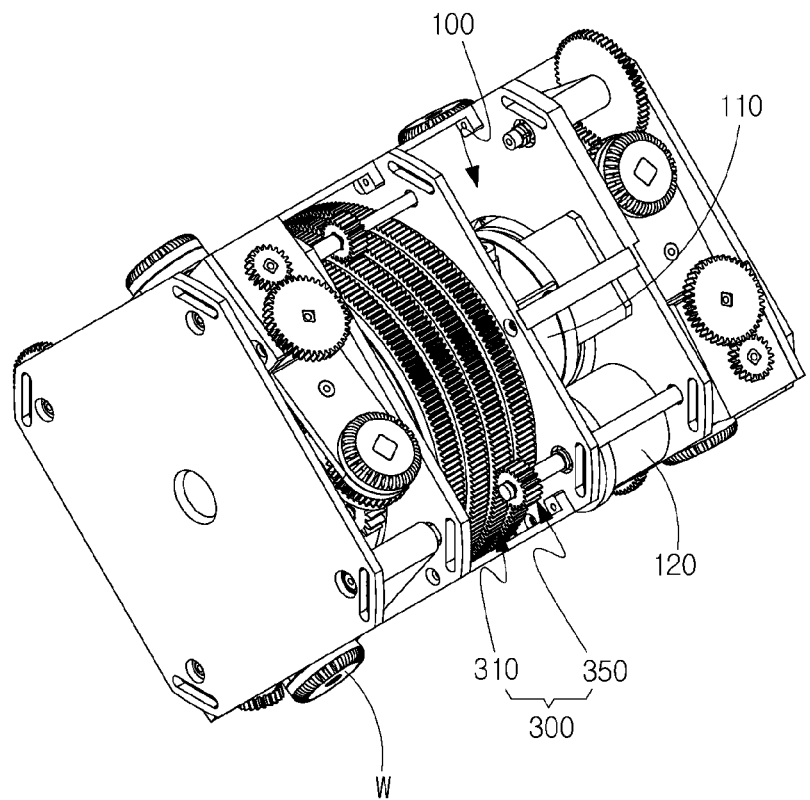
FIG. 2 is a view illustrating a state where an active proceeding unit and passive proceeding unit of the robot in FIG. 1 have rotated.
Figure 3:
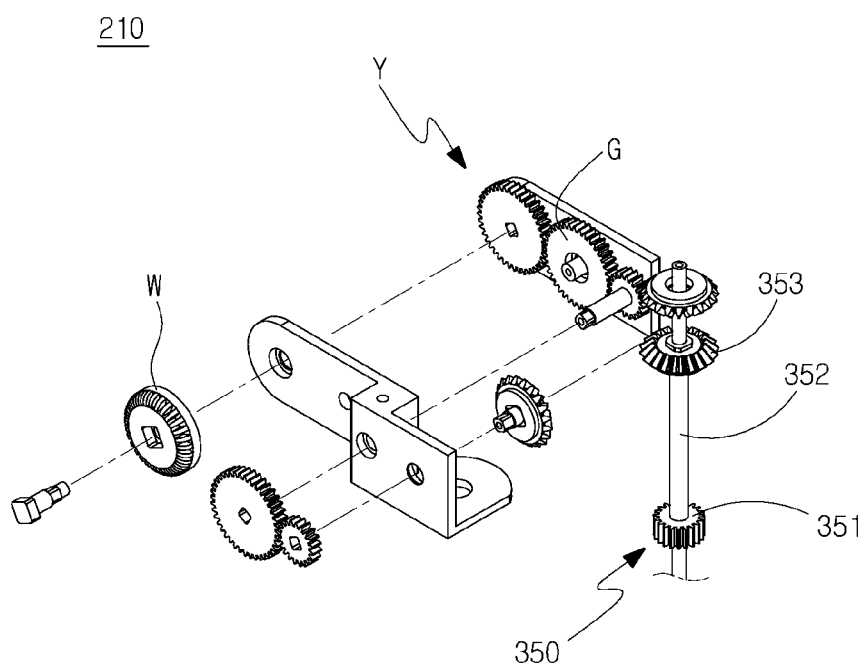
FIG. 3 is a view illustrating the active proceeding unit of FIG. 1.
Figure 4:
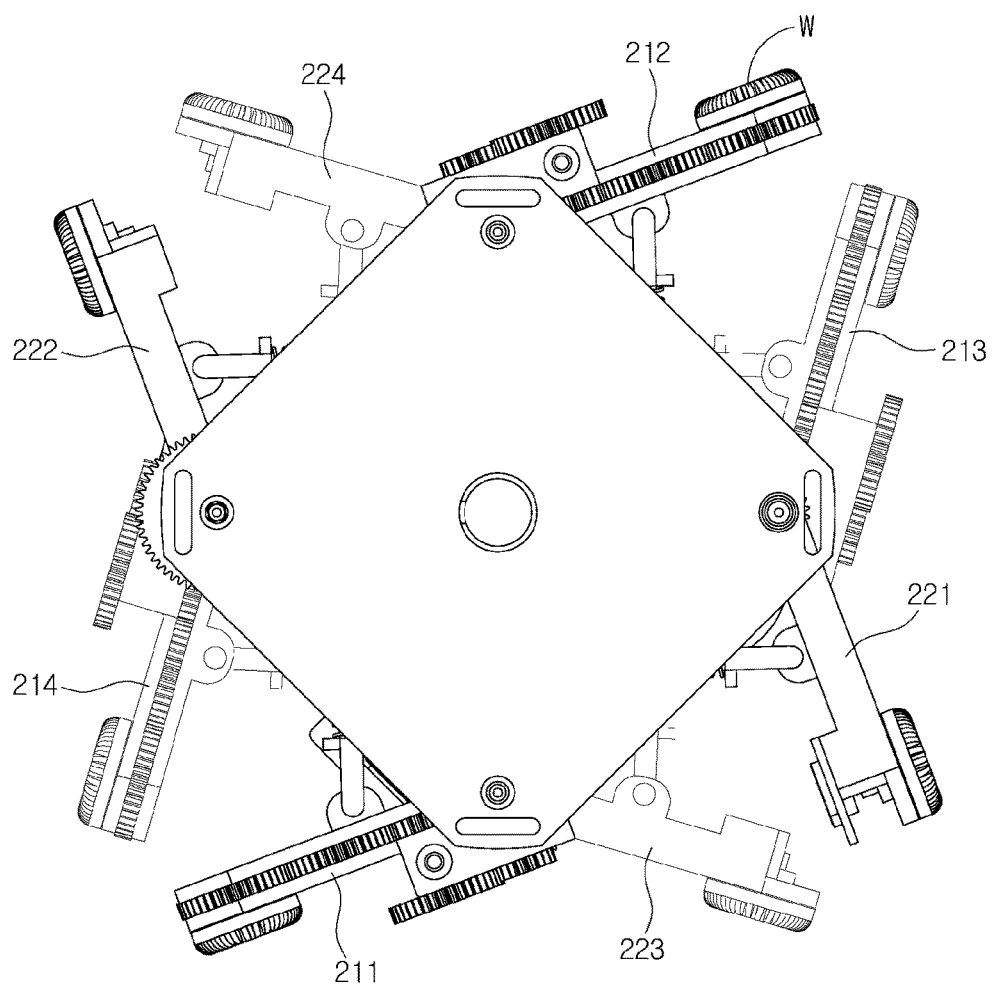
FIG. 4 is a front view of FIG. 1.
Figure 5:
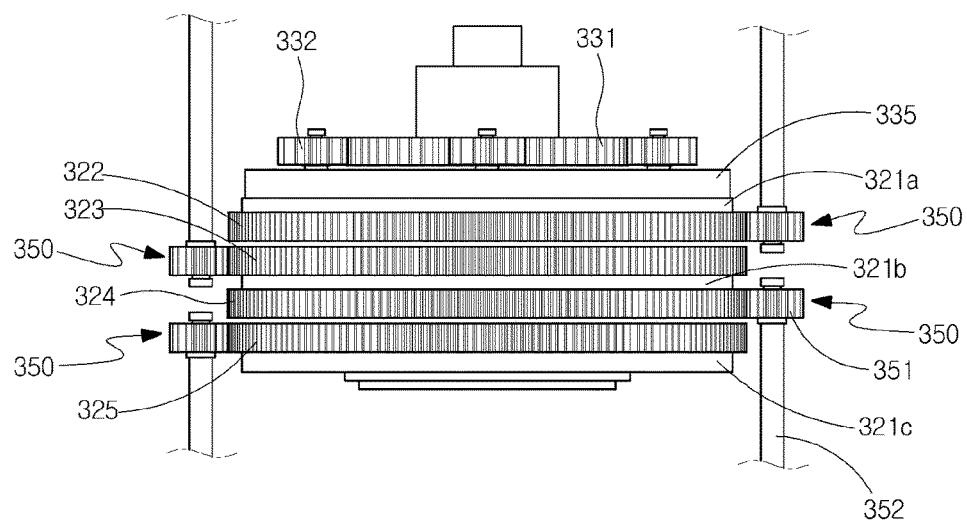
FIG. 5 is a view illustrating a driving power transmission unit of FIG. 1.
Figure 6:
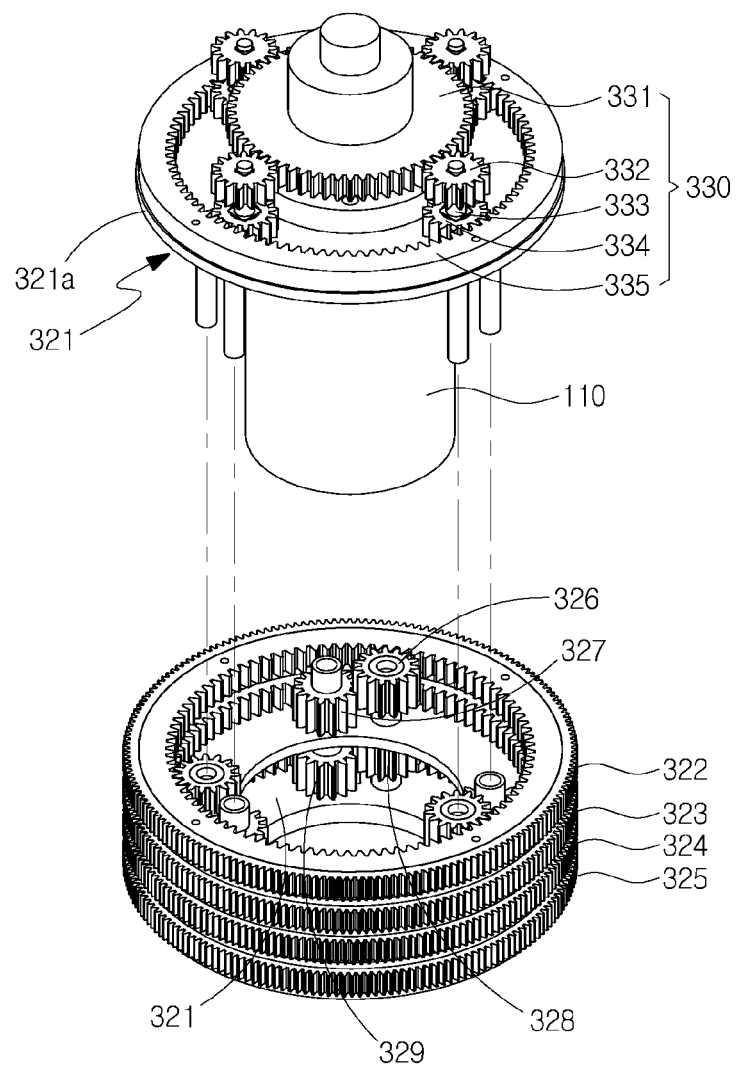
FIG. 6 is an exploded perspective view illustrating the multi-output differential module of FIG. 5.
Figure 7:
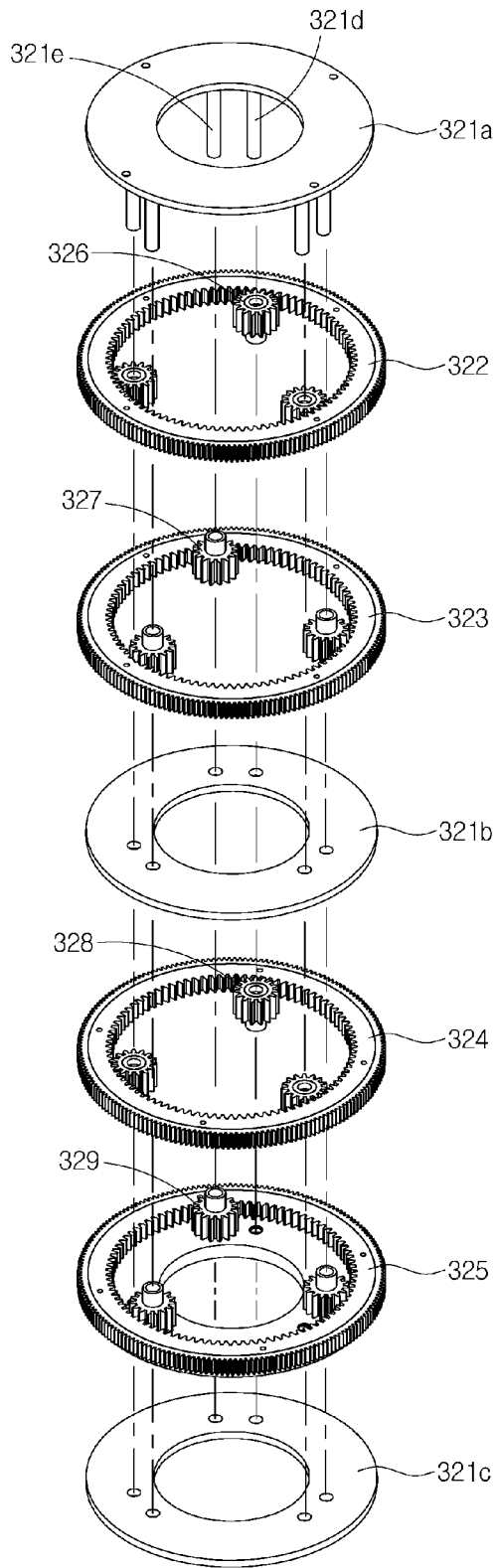
FIG. 7 is an exploded perspective view illustrating a differential gear unit of FIG. 6.
Figure 8:
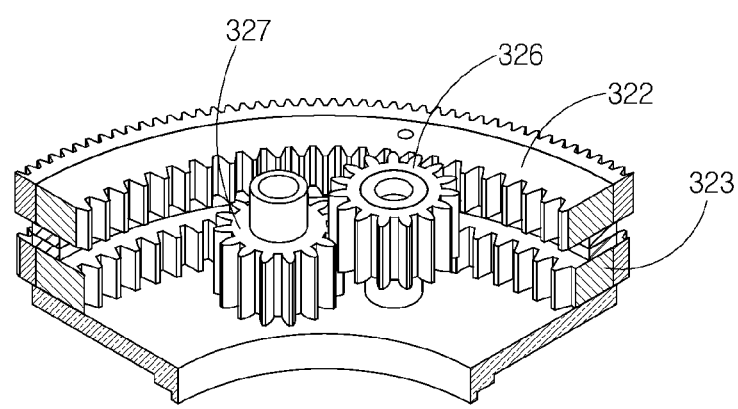
FIG. 8 is a view illustrating a first planetary gear and second planetary gear of FIG. 7.
Figure 9:
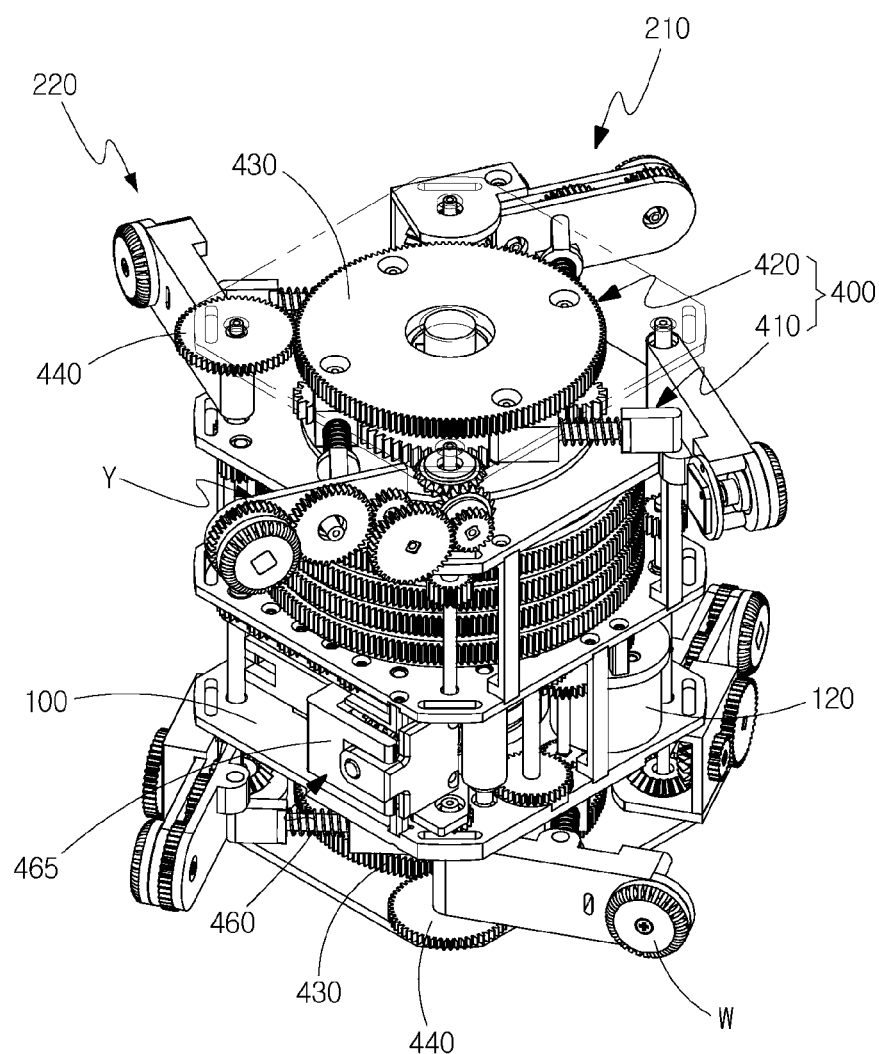
FIG. 9 is a perspective view of FIG. 1 seen from another direction.
Figure 10:
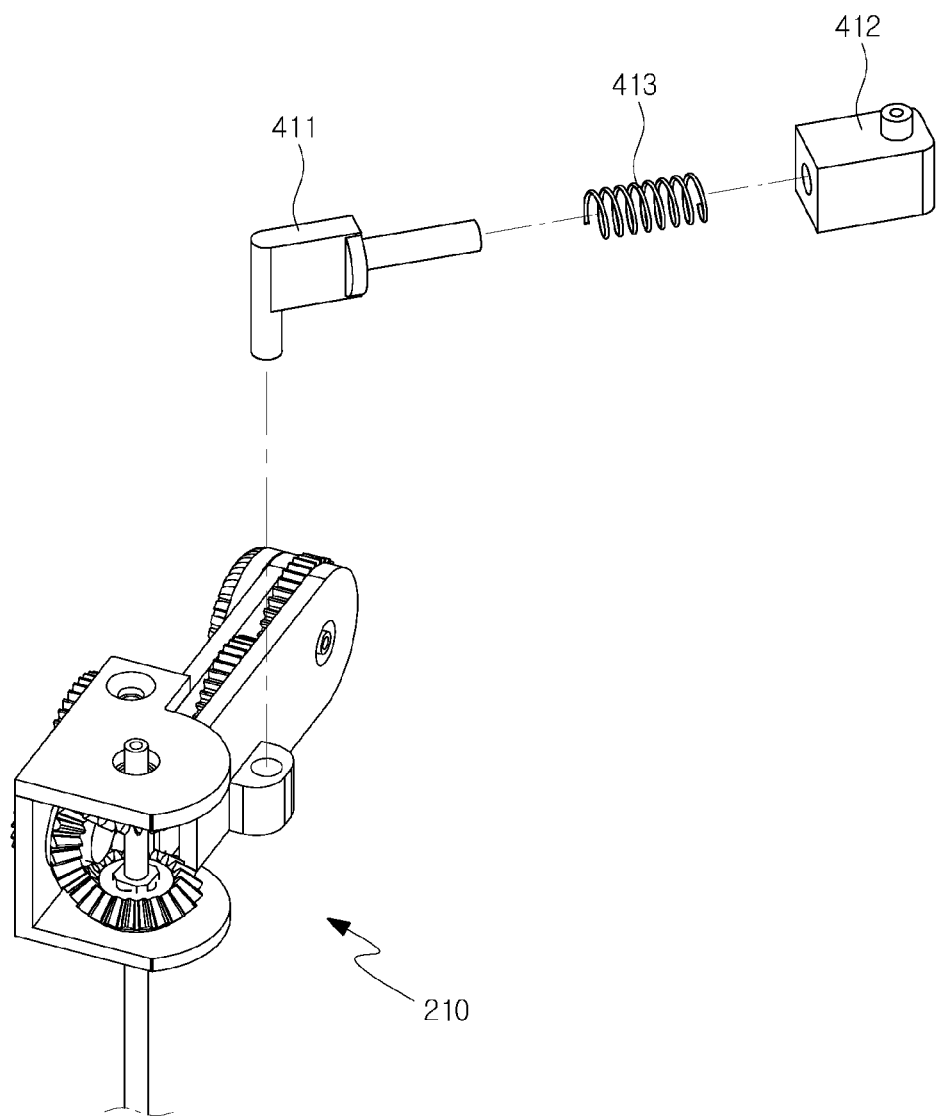
FIG. 10 is a view illustrating an arm module of FIG. 9.
Figure 11:
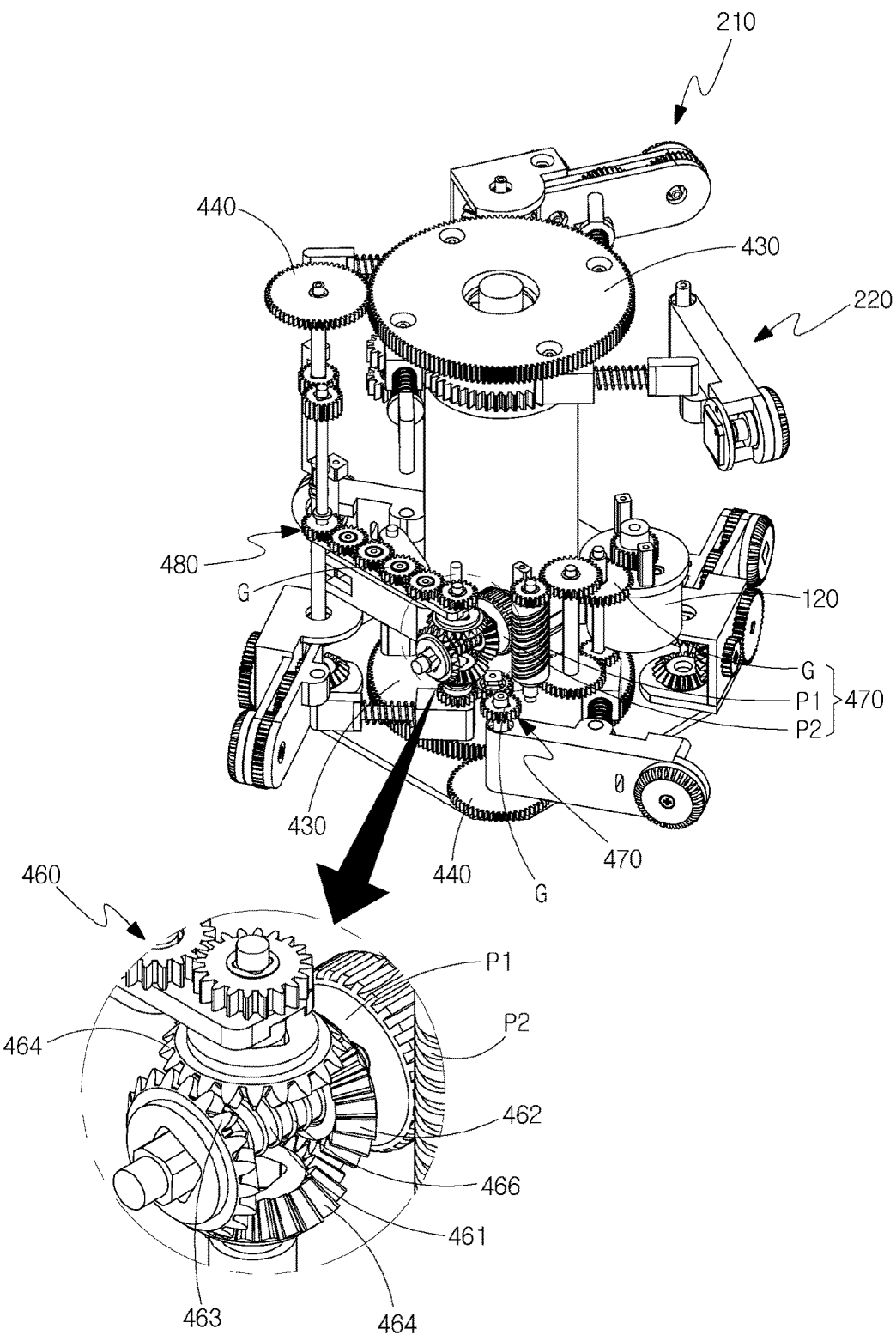
FIG. 11 is a view illustrating a driving power supply unit for adjusting distances between proceeding units of FIG. 9.
Figure 12:
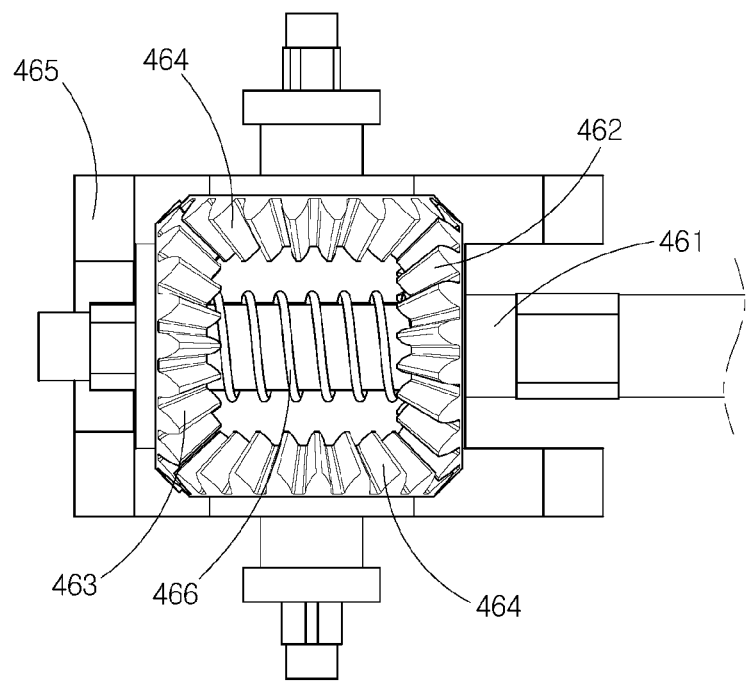
FIG. 12 is a view illustrating an operational state of a power control unit of FIG. 13.
Figure 13:
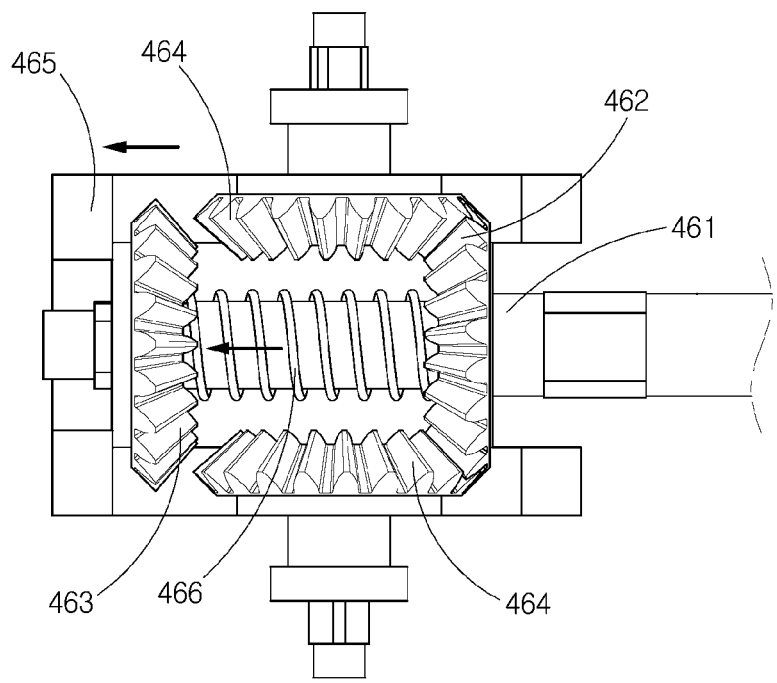

FIG. 1 is a view illustrating a robot for inspection of pipelines using multi-output differential modules according to an embodiment of the present disclosure, FIG. 2 is a view illustrating a state where an active proceeding unit and passive proceeding unit of the robot in FIG. 1 have rotated, FIG. 3 is a view illustrating the active proceeding unit of FIG. 1, FIG. 4 is a front view of FIG. 1, FIG. 5 is a view illustrating a driving power transmission unit of FIG. 1, FIG. 6 is an exploded perspective view illustrating the multi-output differential module of FIG. 5, FIG. 7 is an exploded perspective view illustrating a differential gear unit of FIG. 6, FIG. 8 is a view illustrating a first planetary gear and second planetary gear of FIG. 7, FIG. 9 is a perspective view of FIG. 1 seen from another direction, FIG. 10 is a view illustrating an arm module of FIG. 9, FIG. 11 is a view illustrating a driving power supply unit for adjusting distances between proceeding units of FIG. 9 (some components are not illustrated so as to illustrate the driving power supply unit for adjusting distances between proceeding units), and FIGS. 12 and 13 are views illustrating an operational state of a power control unit.

A robot for inspection of pipeline using a multi-output differential module 310 according to an embodiment of the present disclosure includes a robot body 100, proceeding unit 200, and power transmission unit 300.

As illustrated in FIGS. 1 to 13, the robot for inspection of pipeline using the multi-output differential module 310 according to the present embodiment includes the robot body 100, the proceeding unit 200 that includes a plurality of active proceeding units 210, and the power transmission unit 300 having the multi-output differential module 310.

More specifically, the robot for inspection of pipeline using the multi-output differential module 310 according to the present embodiment includes the robot body 100 configured to move along the inside of the pipeline (not illustrated) and having a driving power supply unit 110, the proceeding unit 200 rotatably-connected to the robot body 100 and including a plurality of active proceeding units 210 having proceeding wheels (W) that proceed along the inside of the pipeline (not illustrated), and the power transmission unit 300 supported against the robot body, connected to the driving power supply unit 110 so as to transmit a driving power to the active proceeding unit 210, and having the multi-output differential module 310 that distributes the transmitted driving power to the active proceeding unit.

The driving power supply unit 110 is mounted onto the robot body 100. In the present embodiment, the driving power supply unit 110 consists of an electric motor. The robot body 100 provided with such a driving power supply unit 110 moves along the inner wall of the pipeline (not illustrated). Furthermore, the robot body 100 is provided with the proceeding unit distance adjusting power supply unit 120 to be used in proceeding unit distance adjusting unit 400 that will be explained hereinafter.

The proceeding unit 200 is rotatably-connected to the robot body 100. In the present embodiment, the proceeding unit 200 includes at least four active proceeding units 210 having proceeding wheels (W) configured to proceed along the inner wall of the pipeline (not illustrated).

The active proceeding unit 210 includes a gear module for driving power transmission 350 to be explained hereinafter and a power supply unit for proceeding unit Y connected to the proceeding wheel (W) and configured to transmit the driving power to the proceeding wheel (W). In the present embodiment, the power supply unit for proceeding unit Y has multiple power transmission gears G, but without limitation, and thus various kinds of power transmission members configured to transmit power may be used as the power supply unit for proceeding unit Y according to the present embodiment.

In the present embodiment, the active proceeding unit 210 includes a first active proceeding unit 211 and second active proceeding unit 212 arranged on a front area of the robot body 100, and a third active proceeding unit 213 and fourth active proceeding unit 214 arranged on a rear area of the robot body 100.

In the present embodiment, the first active proceeding unit 211 and second active proceeding unit 212 are arranged symmetrically to each other based on a central area of the robot body 100. Furthermore, the third active proceeding unit 213 and fourth active proceeding unit 214 are arranged symmetrically to each other based on a central area of the robot body 100.

The proceeding wheel (W) provided in such an active proceeding unit 210 is connected to the multi-output differential module 310 and is rotated by the driving power supplied from the driving power supply unit 110.

Furthermore, the proceeding unit 200 further includes a passive proceeding unit 220 that is rotatably-connected to the robot body 100, and that has a proceeding wheel (W) supported against the inner wall of the pipeline (not illustrated).

Such a passive proceeding unit 220 includes a first passive proceeding unit 221 and second passive proceeding unit 222 that are positioned in a front area of the robot body 100 and are arranged symmetrically to each other based on a central area of the robot body 100, and a third passive proceeding unit 223 and fourth passive proceeding unit 224 that are positioned in a rear area of the robot body 100 and are arranged symmetrically to each other based on a central area of the robot body 100.

In the present embodiment, the first passive proceeding unit 221 and second passive proceeding unit 222 are arranged symmetrically to each other based on the central area of the robot body 100. Furthermore, the third passive proceeding unit 223 and fourth passive proceeding unit 224 are arranged symmetrically to each other based on the central area of the robot body 100.

Meanwhile, the power transmission unit 300 is supported against the robot body 100, and is connected to the driving power supply unit 110 to transmit the driving power to the active proceeding unit 210. Furthermore, the power transmission unit 300 is provided with a multi-output differential module 310 that distributes the transmitted driving power to the active proceeding unit 210.

The multi-output differential module 310 includes a differential gear unit 320 that is rotatably-connected to the robot body 100 and that transmits the driving power to each active proceeding unit 210, and a differential gear rotating unit 330 that is connected to the driving power supply unit 110 and that receives the driving power from the driving power supply unit 110 and rotates the differential gear unit 320.

The differential gear unit 320 is rotatably-connected to the robot body 100, and transmits power to each active proceeding unit 210.

Such a differential gear unit 320 includes a differential gear frame unit 321 that is connected to the differential gear rotating unit 330, a first output gear 322 and second output gear 323 that are connected such that they are relatively rotatable against the differential gear frame unit 321 and between each other, a third output gear 324 and fourth output gear 325 that are connected such that they are relatively rotatable against the differential gear frame unit 321 and between each other, a first planetary gear 326 that is rotatably-connected to a first rotation axis 321d provided in the differential gear frame unit 321 and that is geared to an inner gear teeth formed in an inner wall of the first output gear 322, a second planetary gear 327 that is rotatably-connected to a second rotation axis 321e provided in the differential gear frame unit 321 and that is geared to an inner gear teeth geared to the first planetary gear 326 and formed in an inner wall of the second output gear 323, a third planetary gear 328 that is rotatably-connected to the first rotation axis 321d and that is geared to the inner gear teeth formed in an inner wall of the third output gear 324, and a fourth planetary gear 329 that is rotatably-connected to the second rotation axis 321e and that is geared to an inner gear teeth geared to the third planetary gear 328 and formed in an inner wall of the fourth output gear 325.

In the present embodiment, the differential gear frame unit 321 is connected to a differential gear rotating unit 330 and is rotated by the differential gear rotating unit 330.

Such a differential gear frame unit 321 has an upper end frame 321a, middle end frame 321b, and lower end frame 321c. The first output gear 322 and second output gear 323 are arranged between the upper end frame 321a and middle end frame 321b, and the third output gear 324 and fourth output gear 325 are arranged between the middle end frame 321b and lower end frame 321c.

These upper end frame 321a, middle end frame 321b, and lower end frame 321c are connected through the first rotation axis 321d and second rotation axis 321e. In the present embodiment, the first rotation axis 321d and second rotation axis 321e constitute one group, and three groups each consisting of the first rotation axis 321d and second rotation axis 321e are provided and arranged with a 120° distance from one another.

Therefore, the first planetary gear 326 and second planetary gear 327 also constitute one group, and three groups each consisting of the first planetary gear 326 and second planetary gear 327 are provided. the third planetary gear 328 and forth planetary gear 329 also constitute one group, and three groups each consisting of the third planetary gear 328 and forth planetary gear 329 are provided.

These first planetary gear 326 and second planetary gear 327 are each directly geared to the first output gear 322 and second output gear 323, respectively, and a lower area of the first planetary gear 326 is geared to an upper area of the second planetary gear 327.

Likewise, the third planetary gear 328 and fourth planetary gear 329 are each directly geared to the third output gear 324 and fourth output gear 325, and a lower area of the third planetary gear 328 is geared to an upper area of the fourth planetary gear 329.

In the present embodiment, the first to fourth output gears 322, 323, 324, 325 are provided as ring gears having gear teeth around their inner circumferences and outer circumferences. These first to fourth output gears 322, 323, 324, 325 may be connected such that they are relatively rotatable against the differential gear frame unit 321 and between one another, and may thus be rotated at different rotating speeds from one another.

Furthermore, the first to fourth output gears 322, 323, 324, 325 are each connected to a gear module for driving power transmission 350 to be explained hereinafter and transmits driving power to the active proceeding unit 210.

Each of the first output gear 322 and second output gear 323 transmits power to the first active proceeding unit 211 and second active proceeding unit 212.

Therefore, during a straight pipeline proceeding of the robot for inspection of pipeline using the multi-output differential module 310, the first active proceeding unit 211 and second active proceeding unit 212 are applied with a same load, and therefore the first output gear 322 and second output gear 323 are rotated at a same speed.

On the other hand, during a curved pipeline proceeding of the robot for inspection of pipeline using the multi-output differential module 310, the first active proceeding unit 211 and second active proceeding unit 212 are applied with different loads from each other (due to the difference of rotation diameters from the turning center, the farther from the center of the turning, the smaller the load applied to the active proceeding unit), and therefore the first output gear 322 and second output gear 323 are rotated at different speeds.

For example, during a curved pipeline proceeding of the robot for inspection of pipeline using the multi-output differential module 310, if the first active proceeding unit 211 is farther from the turning center than the second active proceeding unit 212, a greater load is applied to the second active proceeding unit 212 than the first active proceeding unit 211, and accordingly the first output gear 322 connected to the first active proceeding unit 211 is rotated at a faster speed than the second output gear 323 connected to the second active proceeding unit 212, and therefore the robot for inspection of pipeline using the multi-output differential module 310 may drive along the curved pipeline without a slip of the proceeding wheel (W) provided in the first active proceeding unit 211 and second active proceeding unit 212.

The output distribution between the third output gear 324 and fourth output gear 325 is made in the same manner as the first output gear 322 and second output gear 323. Therefore, each of the third output gear 324 and fourth output gear 325 may distribute power to the third active proceeding unit 213 and fourth active proceeding unit 214 that are arranged symmetrically to each other based on the central area of the robot body 100.

As aforementioned, in the robot for inspection of pipeline using the multi-output differential module according to the present embodiment, driving power is distributed to the first active proceeding unit 211 and second active proceeding unit 212 arranged symmetrically to each other based on the central area of the robot body 100 through the first output gear 322 and second output gear 323, and driving power is distributed to the third active proceeding unit 213 and fourth active proceeding unit 214 arranged symmetrically to each other based on the central area of the robot body 100 through the third output gear 324 and fourth output gear 325, and therefore the robot may turn stably without a slip of the proceeding wheel (W).

Meanwhile, the differential gear rotating unit 330 is connected to the driving power supply unit 110, and receives the driving power from the driving power supply unit 110 and rotates the differential gear unit 320.

Such a differential gear rotating unit 330 includes a main driving gear 331 connected to the driving power supply unit 110, a first subsidiary driving gear 332 geared to the main driving gear 331, a rotation axis for subsidiary driving gear 333 connected to the first subsidiary driving gear 332, a second subsidiary driving gear 334 connected to the rotation axis for subsidiary driving gear 333, and a ring gear for differential gear unit 335 connected to the differential gear unit 320 and geared to the second subsidiary driving gear 334.

The main driving gear 331 is connected to the driving power supply unit 110 and is rotated by the driving power supply unit 110.

In the present embodiment, the rotation axis for subsidiary driving gear 333 is arranged at a 90° distance based on the main driving gear 331. To an upper end area of the rotation axis for subsidiary driving gear 333, the first subsidiary driving gear 332 is connected, and to a lower end area of the rotation axis for subsidiary driving gear 333, the second subsidiary driving gear 334 is connected.

The first subsidiary driving gear 332 is geared to the main driving gear 331, and is rotated by the power received from the main driving gear 331, and when the first subsidiary driving gear 332 rotates, the second subsidiary driving gear 334 is also rotated. Herein, since the second subsidiary driving gear 334 is geared to the ring gear for differential gear unit 335, when the second subsidiary driving gear 334 rotates, the ring gear for differential gear unit 335 is also rotated.

As aforementioned, the driving power supplied from the driving power supply unit 110 is transmitted to the differential gear unit 320 via the main driving gear 331, first subsidiary driving gear 332, second subsidiary driving gear 334, and ring gear for differential gear unit 335. Such driving power transmitted to the differential gear unit 320 is distributed to the first output gear 322, second output gear 323, third output gear 324, and fourth output gear 325, and then transmitted to the active proceeding unit 210.

Meanwhile, the power transmission unit 300 includes a gear module for driving power transmission 350 connected to the multi-output differential module 310 and to the active proceeding unit 210, and that transmits driving power to the active proceeding unit 210.

Such a gear module for driving power transmission 350 includes a first driving power transmission gear 351 geared to each of the first to fourth output gears 322, 323, 324, 325, a driving power transmission axis 352 to which the first driving power transmission gear 351 is connected and that is rotated together with the first driving power transmission gear 351, and a second driving power transmission gear 353 connected to a motor gear unit of the active proceeding unit 210.

Meanwhile, the robot for inspection of pipeline using the multi-output differential module 310 according to the present embodiment further includes a proceeding unit distance adjusting unit 400 that is supported against the robot body 100, connected to a proceeding unit distance adjusting power supply unit 120 mounted on the robot body 100, and connected to the active proceeding unit 210 and passive proceeding unit 220 to move the active proceeding unit 210 and passive proceeding unit 220 towards or away from the robot body 110.

As the proceeding unit distance adjusting unit 400 moves the active proceeding unit 210 and passive proceeding unit 220 towards and away from the robot body 100, it is possible to change the size of the robot for inspection of pipeline using the multi-output differential module 310, and therefore it is possible to adjust the size of the robot for inspection of pipeline using the multi-output differential module 310 to fit various sizes of the pipeline (not illustrated).

Such a proceeding unit distance adjusting unit 400 includes an arm module 410 connected to each of the active proceeding unit 210 and passive proceeding unit 220, and an arm module rotating unit 420 connected to the arm module 410 and configured to rotate the arm module 410 so that the active proceeding unit 210 and passive proceeding unit 220 may rotate.

The arm module 410 is connected to each of the active proceeding unit 210 and passive proceeding unit 220. Such an arm module 410 includes a first arm body 411 that is rotatably-connected to each of the active proceeding unit 210 and passive proceeding unit 220, a second arm body 412 that is rotatably-connected to the arm module rotating unit 420 and to which the first arm body 411 is connected in a slidable manner, and an arm module elasticity body 413 that is connected to the first arm body 411 and second arm body 412 and that elastically supports the first arm body 411.

The arm module 410 according to the present embodiment includes the first arm body 411 that is connected to the second arm body 412 in a slidable manner and the arm module elasticity body 413 that elastically supports the first arm body 411, and may therefore absorb the impact occurring when driving along the inner wall of the pipeline (not illustrated).

The arm module rotating unit 420 is connected to the arm module 410, and rotates the arm module 410. Such an arm module rotating unit 420 includes a first manipulating gear 430 to which the arm module 410 is rotatably-connected, a second manipulating gear 440 geared to the first manipulating gear 430, and proceeding unit distance adjusting power transmission units 460, 470, 480 that are connected to the second manipulating gear 440 and to the proceeding unit distance adjusting power supply unit 120 so as to transmit the power of the proceeding unit distance adjusting power supply unit 120 to the second manipulating gear 440.

In the present embodiment, the first manipulating gear 430 and second manipulating gear 440 are each arranged on a front area and rear area of the robot body 100, respectively.

The proceeding unit distance adjusting power transmission units 460, 470, 480 are connected to the second manipulating gear 440, and to the proceeding unit distance adjusting power supply unit 120, and transmits the power of the proceeding unit distance adjusting power supply unit 120 to the second manipulating gear 440.

These proceeding unit distance adjusting power transmission units 460, 470, 480 include a power control unit 460 for selectively transmitting or stop transmitting the power supplied from the proceeding unit distance adjusting power supply unit 120 to the second manipulating gear 440. Furthermore, the proceeding unit distance adjusting power transmission units 460, 470, 480 of the present embodiment further include a first motor unit 470 connected to the proceeding unit distance adjusting power supply unit 120 and connected to the power control unit 460 to transmit the power of the proceeding unit distance adjusting power supply unit 120 to the power control unit 460, and a second motor unit 480 connected to the power control unit 460 and connected to second manipulating gear 440 to transmit the power transmitted to the power control unit 460 to the second manipulating gear 440.

In the present embodiment, as illustrated in FIG. 11, the first motor unit 470 includes a plurality of power transmission gears (G), worms (P1), and worm wheels (P2) for transmitting the power of the proceeding unit distance adjusting power supply unit 120.

In the present embodiment, as illustrated in FIG. 11, the second motor unit 480 includes a plurality of power transmission gears (G).

In general cases, when adjusting the distance between the active proceeding unit 210 and passive proceeding unit 220 regarding the robot body 100 according to the diameter of the pipeline (not illustrated), the power control unit 460 transmits the power of the proceeding unit distance adjusting power supply unit 120 to the second motor unit 480. On the other hand, in cases of emergency such as a breakdown of the multi-output differential module 310 and the like, the power control unit 460 does not transmit the power of the proceeding unit distance adjusting power supply unit 120 to the second motor unit 480.

For this purpose, the power control unit 460 includes a rotation axis for power transmission 461 that receives the power of the proceeding unit distance adjusting power supply unit 120 and rotates, an idle gear 462 that is connected to the rotation axis for power transmission 461 in a relatively rotatable manner, a sliding gear 463 that rotates together with the rotation axis for power transmission 461 but connected to the rotation axis for power transmission 461 in such a manner that it is slidable towards and away from the idle gear 462, a side gear 464 arranged between the sliding gear 463 and idle gear 462, geared to the sliding gear 463 and connected to the second manipulating gear 440, a sliding gear support unit 465 that is connected to the robot body 100 such that it is relatively movable against the robot body 100 and that supports the sliding gear 463 in a direction towards and away from the idle gear 462, an elasticity body for power control unit 466 that is supported against the idle gear 462 and that elastically-biases the sliding gear 463 away from the idle gear 462, and a stopper (not illustrated) provided in the robot body 100 and is selectively connected to or disconnected from the sliding gear support unit 465 to selectively restrict the movement of the sliding gear support unit 465.

In the present embodiment, the rotation axis for power transmission 461 is connected to the first motor unit 470, and receives the power of the proceeding unit distance adjusting power supply unit 120, and rotates.

Furthermore, in the present embodiment, the side gear 464 is connected to the second manipulating gear 440 through the second motor unit 480.

In the present embodiment, the stopper (not illustrated) is usually connected to the sliding gear support unit 465 so that the power of the proceeding unit distance adjusting power supply unit 120 may be transmitted to the second manipulating gear 440, and thus controls the movement of the sliding gear support unit 465.

On the other hand, as mentioned above, in emergency cases when the multi-output differential module 310 breakdowns and the like, a control signal of a user is received wiredly or wirelessly, and a disconnection is made at the sliding gear support unit 465. Herein, the sliding gear 463 is disgeared from the side gear 464 by the elasticity body for power control unit 466, and therefore the power of the proceeding unit distance adjusting power supply unit 120 is not transmitted to the second manipulating gear 440.

As such, when the sliding gear 463 and side gear 464 are disgeared from each other, the first manipulating gear 430 may be free-rotated, and accordingly, the active proceeding unit 210 and passive proceeding unit 220 do not pressurize the inner wall of the pipeline (not illustrated).

When the proceeding unit and passive proceeding unit 220 are not pressurizing the pipeline (not illustrated), a separate tow robot dispatched into the pipeline (not illustrated) may easily tow the robot for inspection of pipeline using the multi-output differential module that is unable to proceed due to a breakdown in the multi-output differential module 310 and the like.

Hereinafter, operations of the aforementioned robot for inspection of pipeline using the multi-output differential module according to an embodiment will be explained with reference to FIGS. 1 and 13.

First of all, the distance of the active proceeding unit 10 and passive proceeding unit 220 regarding the robot body 100 is adjusted using the proceeding unit distance adjusting unit 400 along the inner diameter of the pipeline (not illustrated). Herein, the sliding gear 463 of the power control unit 460 is geared to the side gear 464 to transmit the power of the proceeding unit distance adjusting power supply unit 120 to the second motor unit 480.

After the distance of the active proceeding unit 210 and passive proceeding unit 220 regarding the robot body 100 is adjusted, the robot for inspection of pipeline using the multi-output differential module 310 is dispatched into the pipeline (not illustrated).

During a straight proceeding of the robot for inspection of pipeline using the multi-output differential module 310, the first active proceeding unit 211, second active proceeding unit 212, third active proceeding unit 213, and fourth active proceeding unit 214 are applied with a same load, and therefore the first output gear 322, second output gear 323, third output gear 324, and fourth output gear 325 are rotated at a same speed, thereby providing the same power output to the first active proceeding unit 211, second active proceeding unit 212, third active proceeding unit 213, and fourth active proceeding unit 214.

On the other hand, during a curved proceeding of the robot for inspection of pipeline using the multi-output differential module 310, the first active proceeding unit 211, second active proceeding unit 212, third active proceeding unit 213, and fourth active proceeding unit 214 are applied with different loads from each other, and therefore the first output gear 322, second output gear 323, third output gear 324, and fourth output gear 325 are rotated at different speeds, thereby providing different power output to the first active proceeding unit 211, second active proceeding unit 212, third active proceeding unit 213, and fourth active proceeding unit 214.

Therefore, the proceeding wheel (W) farther away from the turning center will rotate faster, and therefore the robot for inspection of pipeline using the multi-output differential module 310 may proceed along the curved pipeline stably without a slip of the proceeding wheel (W).

Meanwhile, in cases of emergency (for example, non-proceedable state) such as a breakdown in the multi-output differential module 310 and the like, the power control unit 460 does not transmit the power of the proceeding unit distance adjusting power supply unit 120 to the second motor unit 480.

That is, the user transmits a control signal wiredly or wirelessly so that the stopper (not illustrated) is disconnected from the sliding gear support unit 465. Herein, the power of the proceeding unit distance adjusting power supply unit 120 is not transmitted to the second manipulating gear 440 as the sliding gear 463 is disgeared from the side gear 464 by the elastic force of the elasticity body for power control unit 466.

When the sliding gear 463 and side gear 464 are disgeared as aforementioned, the first manipulating gear 430 may be free-rotated, and accordingly, the active proceeding unit 210 and passive proceeding unit 220 do not pressurize the inner wall of the pipeline (not illustrated).

When the proceeding unit and passive proceeding unit 220 are not pressurizing the pipeline (not illustrated) as aforementioned, a separate tow robot dispatched into the pipeline (not illustrated) may easily tow the robot for inspection of pipeline using the multi-output differential module that is unable to proceed due to a breakdown in the multi-output differential module 310 and the like.

While this disclosure includes desirable embodiments of the present disclosure various changes in form and details may be made in these embodiments without departing from the spirit and scope of the claims and their equivalents. Therefore, the aforementioned description of the present disclosure does not limit the scope of the present disclosure defined by the limitations of the claims.

REFERENCE NUMERALS

100: ROBOT BODY
110: DRIVING POWER SUPPLY UNIT
120: PROCEEDING UNIT DISTANCE ADJUSTING POWER SUPPLY UNIT
200: PROCEEDING UNIT
210: ACTIVE PROCEEDING UNIT
211: FIRST ACTIVE PROCEEDING UNIT
212: SECOND ACTIVE PROCEEDING UNIT
213: THIRD ACTIVE PROCEEDING UNIT
214: FOURTH ACTIVE PROCEEDING UNIT
220: PASSIVE PROCEEDING UNIT
221: FIRST PASSIVE PROCEEDING UNIT
222: SECOND PASSIVE PROCEEDING UNIT
223: THIRD PASSIVE PROCEEDING UNIT
224: FOURTH PASSIVE PROCEEDING UNIT
300: POWER TRANSMISSION UNIT
310: MULTI-OUTPUT DIFFERENTIAL MODULE
320: DIFFERENTIAL GEAR UNIT
321: DIFFERENTIAL GEAR FRAME UNIT
321A: UPPER END FRAME
321B: MIDDLE END FRAME
321C: LOWER END FRAME
321D: FIRST ROTATION AXIS
321E: SECOND ROTATION AXIS
322: FIRST OUTPUT GEAR
32: SECOND OUTPUT GEAR
324: THIRD OUTPUT GEAR
325: FOURTH OUTPUT GEAR
326: FIRST PLANETARY GEAR
327: SECOND PLANETARY GEAR
328: THIRD PLANETARY GEAR
329: FOURTH PLANETARY GEAR
330: DIFFERENTIAL GEAR ROTATING UNIT
331: MAIN DRIVING GEAR
332: FIRST SUBSIDIARY DRIVING GEAR
333: ROTATION AXIS FOR SUBSIDIARY DRIVING GEAR
334: SECOND SUBSIDIARY DRIVING GEAR
335: RING GEAR FOR DIFFERENTIAL GEAR UNIT
350: GEAR MODULE FOR DRIVING POWER TRANSMISSION
351: FIRST DRIVING POWER TRANSMISSION GEAR
352: DRIVING POWER TRANSMISSION AXIS
353: SECOND DRIVING POWER TRANSMISSION GEAR
400: PROCEEDING UNIT DISTANCE ADJUSTING UNIT
410: ARM MODULE
411: FIRST ARM BODY
412: SECOND ARM BODY
413: ARM MODULE ELASTICITY BODY
420: ARM MODULE ROTATING UNIT
430: FIRST MANIPULATING GEAR
440: SECOND MANIPULATING GEAR
460: POWER CONTROL UNIT
461: ROTATION AXIS FOR POWER TRANSMISSION
462: IDLE GEAR
463: SLIDING GEAR
464: SIDE GEAR
465: SLIDING GEAR SUPPORT UNIT
466: ELASTICITY BODY FOR POWER CONTROL UNIT
470: FIRST MOTOR UNIT
480: SECOND MOTOR UNIT
W: PROCEEDING WHEEL

What is claimed is:

1. A robot for inspection of a pipeline using a multi-output differential module, the robot comprising:
   a robot body configured to move along an inside of the pipeline, and having a driving power supply unit;
   a proceeding unit rotatably-connected to the robot body, and provided with a plurality of active proceeding units having proceeding wheels that proceed along an inner wall of the pipeline; and
   a power transmission unit supported against the robot body, connected to the driving power supply unit to transmit driving power to the active proceeding unit, and having the multi-output differential module that distributes the transmitted driving power to the active proceeding unit,
   wherein the multi-output differential module drives at least one of the plurality of active proceeding units at a speed different from a speed of another one of the plurality of active proceeding units upon the robot turning.

2. The robot according to claim 1,
   wherein the multi-output differential module comprises:
   a differential gear unit rotatably-connected to the robot body, and configured to transmit the power to each active proceeding unit; and
   a differential gear rotating unit connected to the driving power supply unit, and configured to receive the driving power from the driving power supply unit to rotate the differential gear unit.

3. The robot according to claim 2,
   wherein the differential gear unit comprises:
   a differential gear frame unit that is connected to the differential gear rotating unit;
   a first output gear and second output gear that are connected such that they are relatively rotatable against the differential gear frame unit and between each other;
   a third output gear and fourth output gear that are connected such that they are relatively rotatable against the differential gear frame unit and between each other;

a first planetary gear that is rotatably-connected to a first rotation axis provided in the differential gear frame unit and that is geared to an inner gear teeth formed in an inner wall of the first output gear;

a second planetary gear that is rotatably-connected to a second rotation axis provided in the differential gear frame unit and that is geared to an inner gear teeth geared to the first planetary gear and formed in an inner wall of the second output gear;

a third planetary gear that is rotatably-connected to the first rotation axis and that is geared to the inner gear teeth formed in an inner wall of the third output gear; and a fourth planetary gear that is rotatably-connected to the second rotation axis and that is geared to an inner gear teeth geared to the third planetary gear and formed in an inner wall of the fourth output gear.

4. The robot according to claim 2,
wherein the differential gear rotating unit comprises:
a main driving gear connected to the driving power supply unit;
a first subsidiary driving gear geared to the main driving gear;
a rotation axis for subsidiary driving gear connected to the first subsidiary driving gear;
a second subsidiary driving gear connected to the rotation axis for subsidiary driving gear; and
a ring gear for differential gear unit connected to the differential gear unit, and geared to the second subsidiary driving gear.

5. The robot according to claim 1,
wherein the power transmission unit comprises a driving power transmission gear module connected to the multi-output differential module and to the active proceeding unit, and configured to transmit the driving power to the active proceeding unit.

6. The robot according to claim 1,
wherein the active proceeding unit comprises:
a first active proceeding unit and second active proceeding unit arranged on a front area of the robot body; and
a third active proceeding unit and fourth active proceeding unit arranged on a rear area of the robot body.

7. The robot according to claim 6,
wherein the first active proceeding unit and second active proceeding unit are arranged symmetrically to each other based on a central area of the robot body, and
the third active proceeding unit and fourth active proceeding unit are arranged symmetrically to each other based on a central area of the robot body.

8. The robot according to claim 7,
wherein the proceeding unit further comprises a passive proceeding unit that is rotatably-connected to the robot body, and that has a proceeding wheel supported against the inner wall of the pipeline.

9. The robot according to claim 8,
wherein the passive proceeding unit comprises:
a first passive proceeding unit and second passive proceeding unit that are positioned in a front area of the robot body and are arranged symmetrically to each other based on a central area of the robot body, and
a third passive proceeding unit and fourth passive proceeding unit that are positioned in a rear area of the robot body and are arranged symmetrically to each other based on a central area of the robot body.

10. The robot according to claim 9,
further comprising a proceeding unit distance adjusting unit that is supported against the robot body, connected to a proceeding unit distance adjusting power supply unit, and connected to the active proceeding unit and passive proceeding unit to move the active proceeding unit and passive proceeding unit towards or away from the robot body.

11. The robot according to claim 10,
wherein the proceeding unit distance adjusting unit comprises:
an arm module connected to each of the active proceeding unit and passive proceeding unit; and
an arm module rotating unit connected to the arm module and configured to rotate the arm module.

12. The robot according to claim 11,
wherein the arm module comprises:
a first arm body that is rotatably-connected to each of the active proceeding unit and passive proceeding unit;
a second arm body that is rotatably-connected to the arm module rotating unit and to which the first arm body is connected in a slidable manner; and
an arm module elasticity body that is connected to the first arm body and second arm body and that elastically supports the first arm body.

13. The robot according to claim 11,
wherein the arm module rotating unit comprises:
a first manipulating gear to which the arm module is rotatably-connected;
a second manipulating gear geared to the first manipulating gear; and
a proceeding unit distance adjusting power transmission unit connected to the second manipulating gear and to the proceeding unit distance adjusting power supply unit to transmit the power of the proceeding unit distance adjusting power supply unit to the second manipulating gear.

14. The robot according to claim 13,
wherein the proceeding unit distance adjusting power transmission unit comprises a power control unit for selectively transmitting or stop transmitting the power supplied from the proceeding unit distance adjusting power supply unit to the second manipulating gear.

15. The robot according to claim 14,
wherein the power control unit comprises:
a rotation axis for power transmission that receives the power of the proceeding unit distance adjusting power supply unit and rotates;
an idle gear that is connected to the rotation axis for power transmission in a relatively rotatable manner;
a sliding gear that rotates together with the rotation axis for power transmission but connected to the rotation axis for power transmission in such a manner that it is slidable towards and away from the idle gear; and
a side gear arranged between the sliding gear and idle gear, geared to the sliding gear and connected to the second manipulating gear; and
a sliding gear support unit that is connected to the robot body such that it is relatively movable against the robot body and that supports the sliding gear in a direction towards and away from the idle gear;
an elasticity body for power control unit that is supported against the idle gear, and that elastically-biases the sliding gear away from the idle gear; and
a stopper provided in the robot body, and is selectively connected to or disconnected from the sliding gear support unit to selectively restrict the movement of the sliding gear support unit.

* * * * *